United States Patent [19]

Sandoval et al.

[11] Patent Number: 5,475,532
[45] Date of Patent: Dec. 12, 1995

[54] INFINITE SPACE KALEIDOSCOPE

[76] Inventors: Juan Sandoval, Suchil 137, El Rosario-Coyoacán, 04380 México, D.F.; Javier Bracho, Cuauhtemoc Poniente 38-B, Miguel Hidalgo, Tlalpan, 14410 México, both of Mexico

[21] Appl. No.: 207,665

[22] Filed: Mar. 9, 1994

[51] Int. Cl.$^6$ ................................................ G02B 23/00
[52] U.S. Cl. ............................................................ 359/616
[58] Field of Search ................................ 353/1; 359/616

[56] References Cited

U.S. PATENT DOCUMENTS

| | | | |
|---|---|---|---|
| 4,232,932 | 11/1980 | Atwater et al. | 359/616 |
| 4,799,764 | 1/1989 | Crowell | 359/616 |
| 4,820,004 | 4/1989 | Briskin | 350/4.1 |
| 5,020,870 | 6/1991 | Gray | 350/4.1 |
| 5,054,865 | 10/1991 | Huang | 359/617 |

FOREIGN PATENT DOCUMENTS 3118735  12/1982  Germany .
47517    5/1975   Israel .

OTHER PUBLICATIONS

Ueber das Gesetz der Symmetrie der Kristalle und die Anwendung dieses Gesetzes auf die Eintheilung der Kristalle in Systeme, Journal fur die reins un abgewandte Mathematik, 43, 365–374 (1852); or Gesammelte Werke, 2, 349–360).
H. S. M. Coxeter, Regular Polytopes, 1973, pp. 71, 81–84 and 310.

Primary Examiner—Richard A. Wintercorn
Attorney, Agent, or Firm—Jacobson, Price, Holman & Stern

[57]  ABSTRACT

A kaleidoscope housing is in the form of an irregular polyhedron having four of its sides providing irregular polygonal reflecting mirrors joined along respective edges of the polyhedron at specified dihedral angles and its remaining sides formed as triangular viewing windows. The windows produce three-dimensional geometric images in the interior space of the housing when viewed through any window, the images having triaxial symmetry and repeating to infinity.

14 Claims, 6 Drawing Sheets

INFINITE SPACE KALEIDOSCOPE

BACKGROUND OF THE INVENTION

The original kaleidoscope design is attributed to Sir David Brewster in 1815. Since then the art is replete with refinements on the original Brewster design including numerous patents on how to provide images, on how to illustrate the images and how to look at the images.

Möbius (Ueber das Gesetz der Symmetrie der Kristalle und die Anwendung dieses Gesetzes auf die Eintheilung der Kristalle in Systeme, Journal für die reins un abgewandte Mathematik, 43, 365–374 (1852); or Gesammelte Werke, 2, 349–360, 1886), theoretically describes polyhedral kaleidoscopes produced by three mirrors in the form of a triangular pyramid.

It is well known that cubes with inward reflecting mirrors provide an infinite virtual image with triaxial symmetry by the arrangement of their six mirrors. This invention produces a similar effect with only four mirrors.

Michael Burt, in Israeli patent No. 47517, dated Jun. 19, 1975 discloses three tetrahedra formed by inside reflecting mirrors, which are referred to as spatial kaleidoscopes. The three tetrahedra are theoretically described by H. S. M. Coxeter in Regular polytopes, Macmillan Company, 1963. However, neither Burr nor Coxeter considered the problems of providing an image, illuminating it and how to look inside it.

More recently, Zsabo and Gülder (in German Patent No. DE 3118735, dated Dec. 2, 1982) discloses a kaleidoscope "consisting of three trapesium-shaped internally reflecting panels arranged to form an equilateral three-sided truncated pyramid". The image produced by Zsabo and Gülder's kaleidoscope comes from the truncated end and is a convex sphere.

In the art of kaleidoscope design, there is a trend to provide binocular kaleidoscopes able to enhance 3-dimensional images. U.S. Pat. No. 4,820,004, of J. K. Briskin of Apr. 11, 1989 and U.S. Pat. No. 5,020,870, of Jun. 4, 1991 of S. J. Gray, disclose binocular kaleidoscopes which add optical aids to the classic designs. This invention can provide binocular kaleidoscopes producing 3-dimensional images without optical aids simply by looking through any of its windows when it is large enough.

S. Huang, in U.S. Pat. No. 5,054,865 of Oct. 8, 1991, describes multilocular kaleidoscopes consisting of two semispherical shells connected with seven Brewster's prism-shaped kaleidoscopes. This invention provides a multiocular kaleidoscope which differs in arrangement.

SUMMARY OF THE INVENTION

According to the invention, there is provided a kaleidoscope in the form of an irregular polyhedron having a plurality of internal reflecting mirrors each in the shape of an irregular polygon and a plurality of triangular windows. Preferably the polyhedron has eight sides; namely four sides providing the inside reflecting mirrors and four triangular windows. Each mirror is joined along three of its sides to the other three mirrors. The dihedral angles between the mirrors can be in any of the following groups:

a) Three dihedral angles of 90°, two of 45°, one 60° b) Three dihedral angles of 90°, two of 60°, one 45° c) Three dihedral angles of 90°, four of 60°.

The windows have a double function: namely as viewing windows, and also they provide images to be kaleidoscopically reflected. The image produced by the kaleidoscope is a virtual infinite space, with four types of geometric solids having kaleidoscopic surfaces floating infinitely many times and arranged with triaxial symmetry. The windows can be large enough for binocular sight enhancing the three dimensional perception. The kaleidoscope allows for simultaneous viewing by up to four observers.

The triangular windows can have different shapes and sizes and, dependent thereon and on their positions the windows produce images of different kaleidoscopic geometric solids:

a) An equilateral triangular window positioned between three mirrors in which the dihedral angles between the respective pairs of mirrors are 90°, 90°, 90° produces images of octahedra.

b) If a window is positioned between mirrors having respective 60°, 60°, 90° dihedral angles and is perpendicular to one of the 60° edges, it produces images of tetrahedra.

c) If any window between mirrors having respective 60°, 90°, 45° dihedral angles is perpendicular to the 60° edge, it produces images of octahedra.

d) If any window between mirrors having respective 90°, 60°, 45° dihedral angles is perpendicular to the 45° edges, it produces images of cubes.

e) If any one of the windows is such that each adjacent mirror has equal planar angles on the edges of the window, then the window produces sphere-like polyhedra.

f) If any one of the windows is a spherical triangle (i.e., a triangle defined on the surface of a sphere) perpendicular to the three adjacent mirrors, the window produces a sphere.

g) Any one of the four windows can be eliminated by continuing the three adjacent mirrors up to their vertices. Then, one of the geometric solids disappears form the image produced by viewing through one of the remaining windows.

The invention thus provides a kaleidoscope which produces an image of an infinite virtual space in which, depending on the choices of the windows, reflections of the windows when viewed through one window form images of geometric solids. Up to four types of geometric solids will appear floating infinitely many times and arranged with triaxial symmetry. The surface of each geometric solid appears with a kaleidoscopic image, formed by reflections of whatever objects are placed behind the corresponding window. The image on the surfaces of the geometric solids is variable and may be changed at will by the observer, for example, by moving a colored cloth or the hands behind any window.

In use, an observer looks through one of the windows, and thus, his or her image appears kaleidoscopically on the corresponding geometric solids; depending on the size of the window, this image can range from an image of the observer's eye to the observer's whole body.

The invention preferably provides a kaleidoscope with four windows. Any of the windows may be used for viewing, and each gives a different perspective of the same virtual space. In any window there can be different devices placed that produce translucent patterns to be kaleidoscopically reflected.

Further along any edge where two mirrors meet, a longitudinal rod or other device can be placed to enhance the triaxial symmetry. Such devices produce a scaffolding-like structure joining the geometric solids. The devices can be light producing or translucid, with a moving image, such as suspended particles in a tube.

The windows may be large enough to allow natural illumination. As more light is admitted, a viewer can see further images in the space. Artificial lighting can also be used.

Binocular sight is provided when any of the windows is large enough. The perception becomes coherently three dimensional.

It is a feature of the invention that the kaleidoscopes admit simultaneous viewing by up to four observers. As long as the described proportions are maintained, the kaleidoscope can be of any size, and basic properties will remain constant.

Kaleidoscopes according to the invention have many useful applications including:

1) As a toy, it can be a small object with many features that motivates interest and creativity of the viewers in an amusing visual entertainment.

2) As a teaching device in topics of three-dimensional euclidian geometry, and chrystalography.

3) As special effect devices. Through the windows images can be provided by different media such as photography, video, hologram projections or live performances which can be recorded, photographed or filmed through the same or any other window.

4) For architectonic designs, if the windows are large enough to allow people to go by, or when it is integrated within walls.

5) For advertisement and exhibitions.

DESCRIPTION OF THE PREFERRED EMBODIMENT

Figure 1:
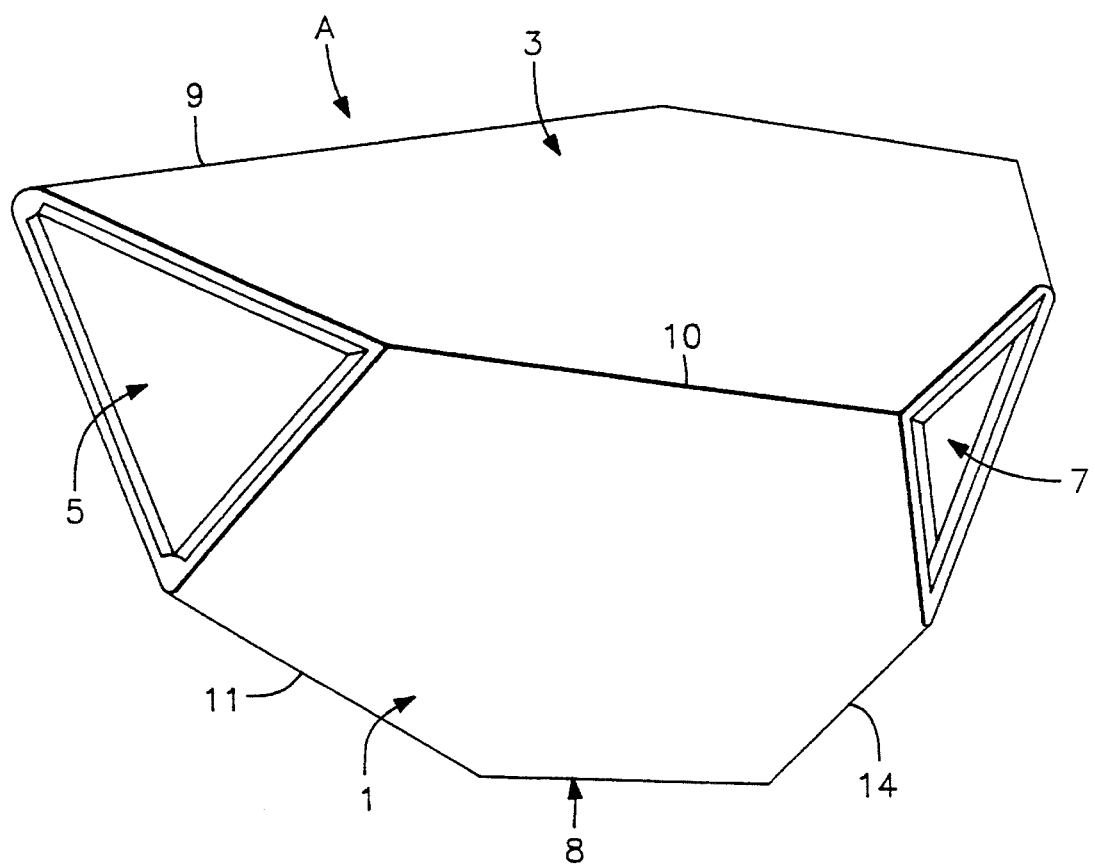
FIG. 1 is a perspective view of a first kaleidoscope according to the invention having dihedral angles comprising three of 90°, two of 60° and one of 45°.
Figure 2:
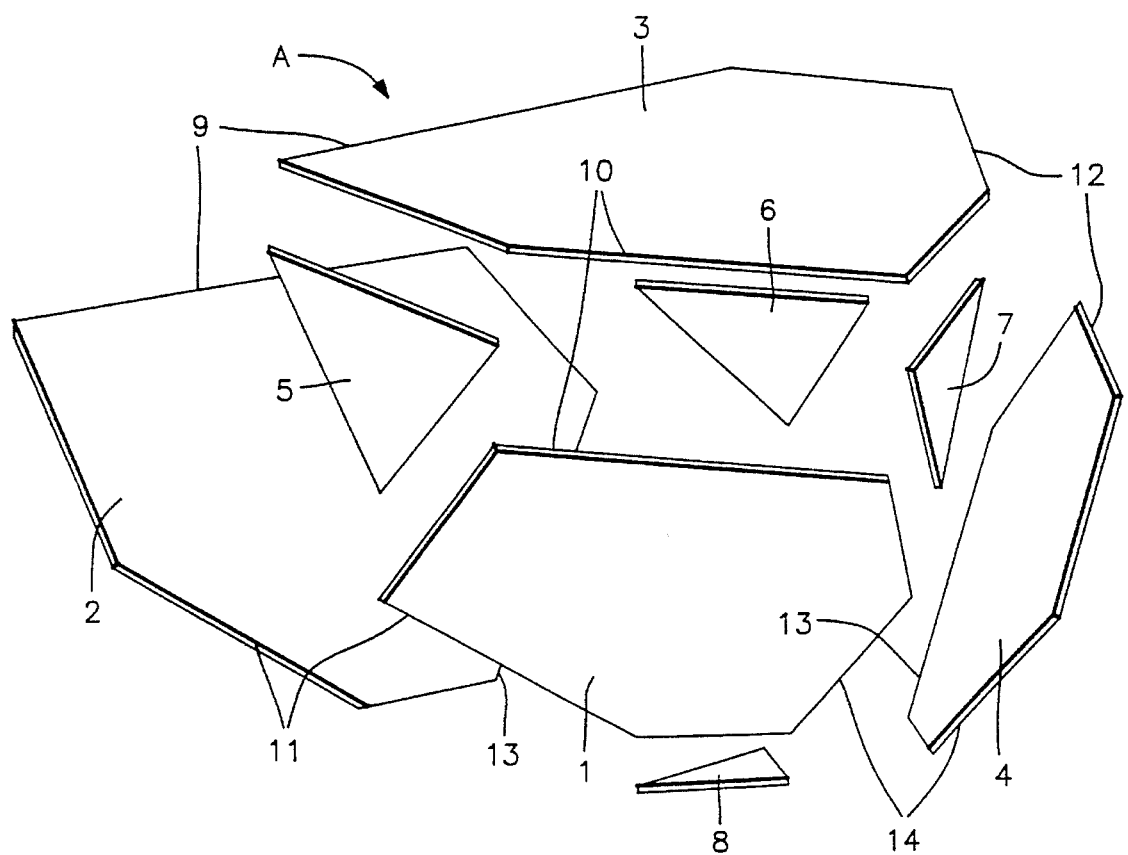
FIG. 2 is an exploded perspective view of the first kaleidoscope.

With reference to FIGS. 1 and 2, the first kaleidoscope comprises a housing A made of four irregular hexagonal panels 1, 2, 3 and 4 with inside reflecting mirrors and four triangular windows 5, 6, 7 and 8. The panels constitute four sides of an irregular octahedron and the windows constitute the remaining four sides.

Panel 1 is positioned at a dihedral angle of 90° with mirror 2 along edge 11.

Panel 1 is positioned at a dihedral angle of 90° with mirror 4 along edge 14.

Panel 1 is positioned at a dihedral angle of 60° with mirror 3 along edge 10.

Panel 2 is positioned at a dihedral angle of 90° with mirror 4 along edge 13.

Panel 2 is positioned at a dihedral angle of 45° with mirror 3 along edge 9.

Panel 3 is positioned at a dihedral angle of 60° with mirror 3 along edge 12.

Window 8 is located between panels 1, 2, 4.
Window 5 is located between panels 1, 2, 3.
Window 6 is located between panels 2, 3, 4.
Window 7 is located between panels 1, 3, 4.

The configuration of each of the panels 1–4 is determined by the dihedral angles and shapes of the windows required for the kaleidoscope.

Figure 3:
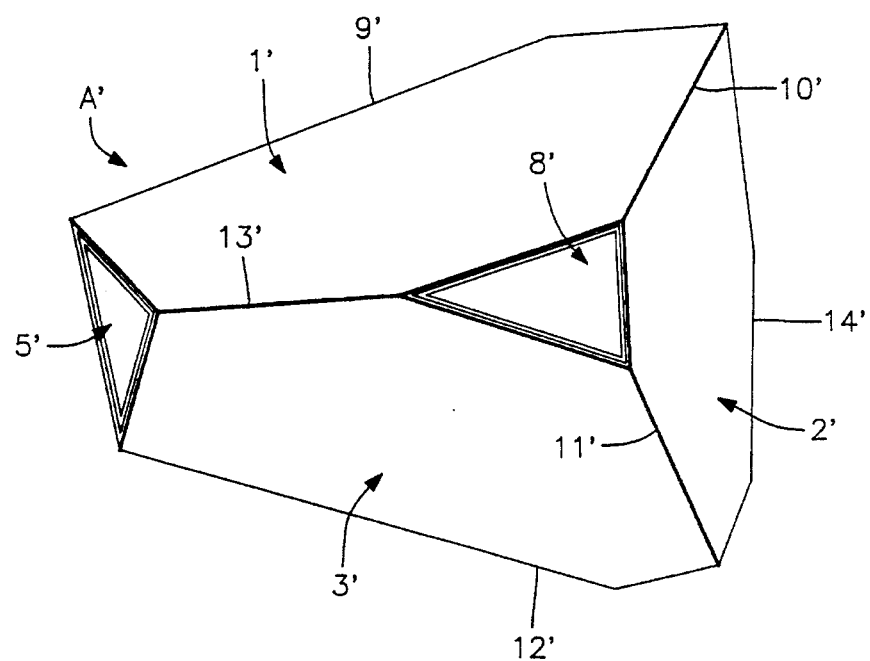
FIG. 3 is a perspective view of a second kaleidoscope according to the invention having dihedral angles comprising three of 90°, two of 45°, one of 60°.
Figure 4:
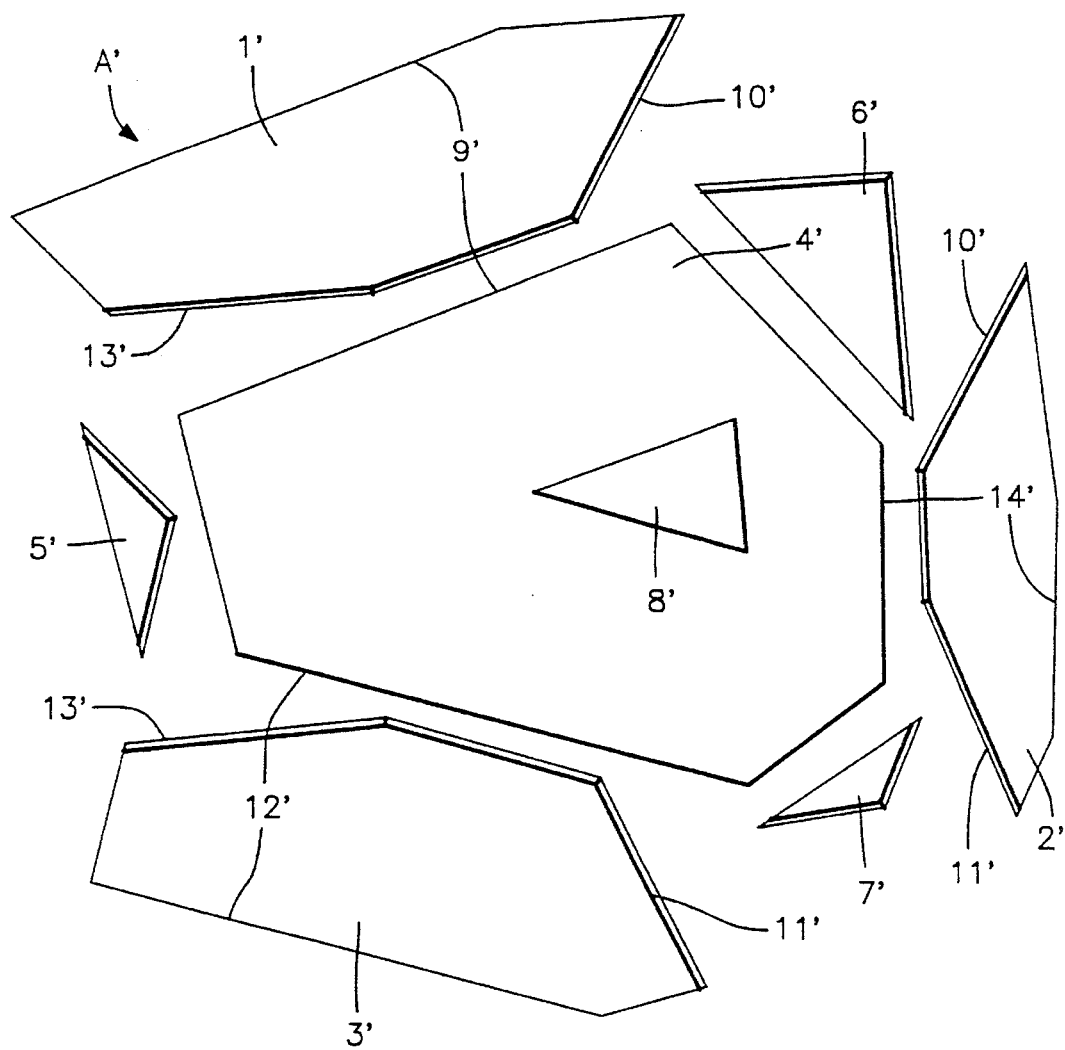
FIG. 4 is an exploded perspective view of the second kaleidoscope.

The second kaleidoscope shown in FIGS. 3 and 4 comprises a housing A' made of four irregular hexagonal panels 1'– 4' with inside reflecting mirrors, and four triangular windows 5'–8'.

Panel 1' is positioned at a dihedral angle of 90° with mirror 2' along edge 10'.

Panel 1' is positioned at a dihedral angle of 45° with mirror 3' along edge 13'.

Panel 1' is positioned at a dihedral angle of 60° with mirror 4' along edge 9'.

Panel 2' is positioned at a dihedral angle of 45° with mirror 4' along edge 14'.

Panel 2' is positioned at a dihedral angle of 90° with mirror 3' along edge 11'.

Panel 3' is positioned at a dihedral angle of 90° with mirror 4' along edge 12'.

Window 5' is located between panels 1', 3', 4'.
Window 6' is located between panels 1', 2', 4'.
Window 7' is located between panels 2', 3', 4'.
Window 8' is located between panels 1', 2', 3'.

Figure 5:
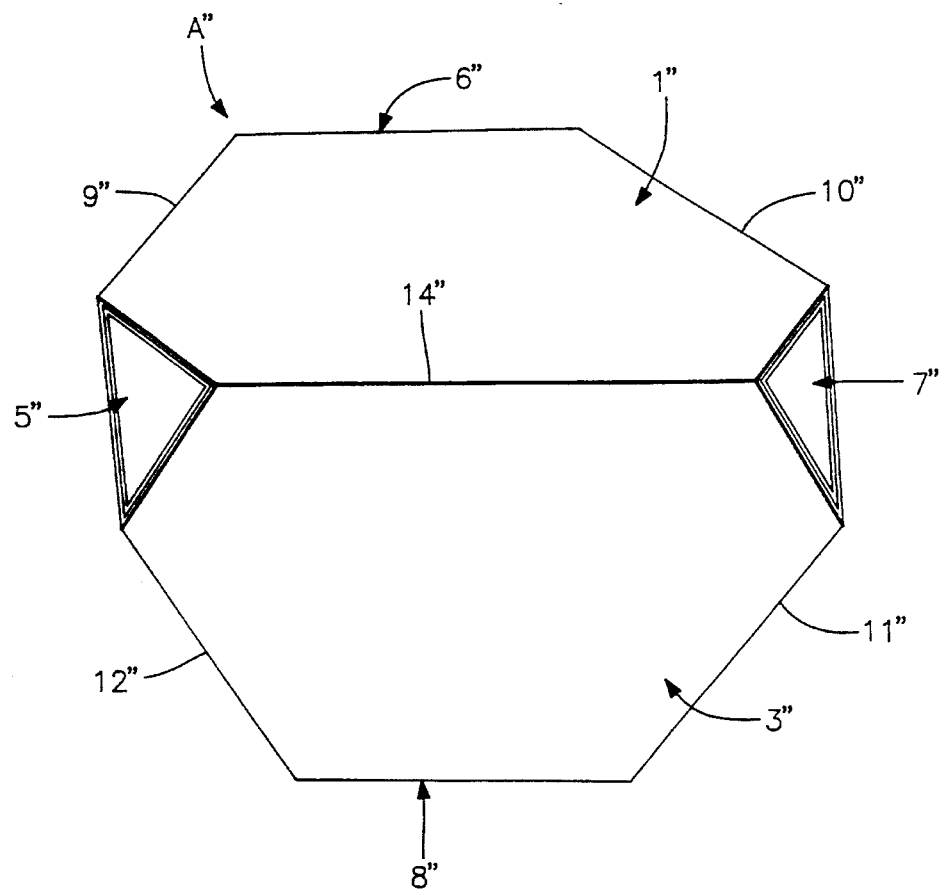
FIG. 5 is a perspective of a third kaleidoscope according to the invention having dihedral angles comprising two of 90° and four of 60°.
Figure 6:
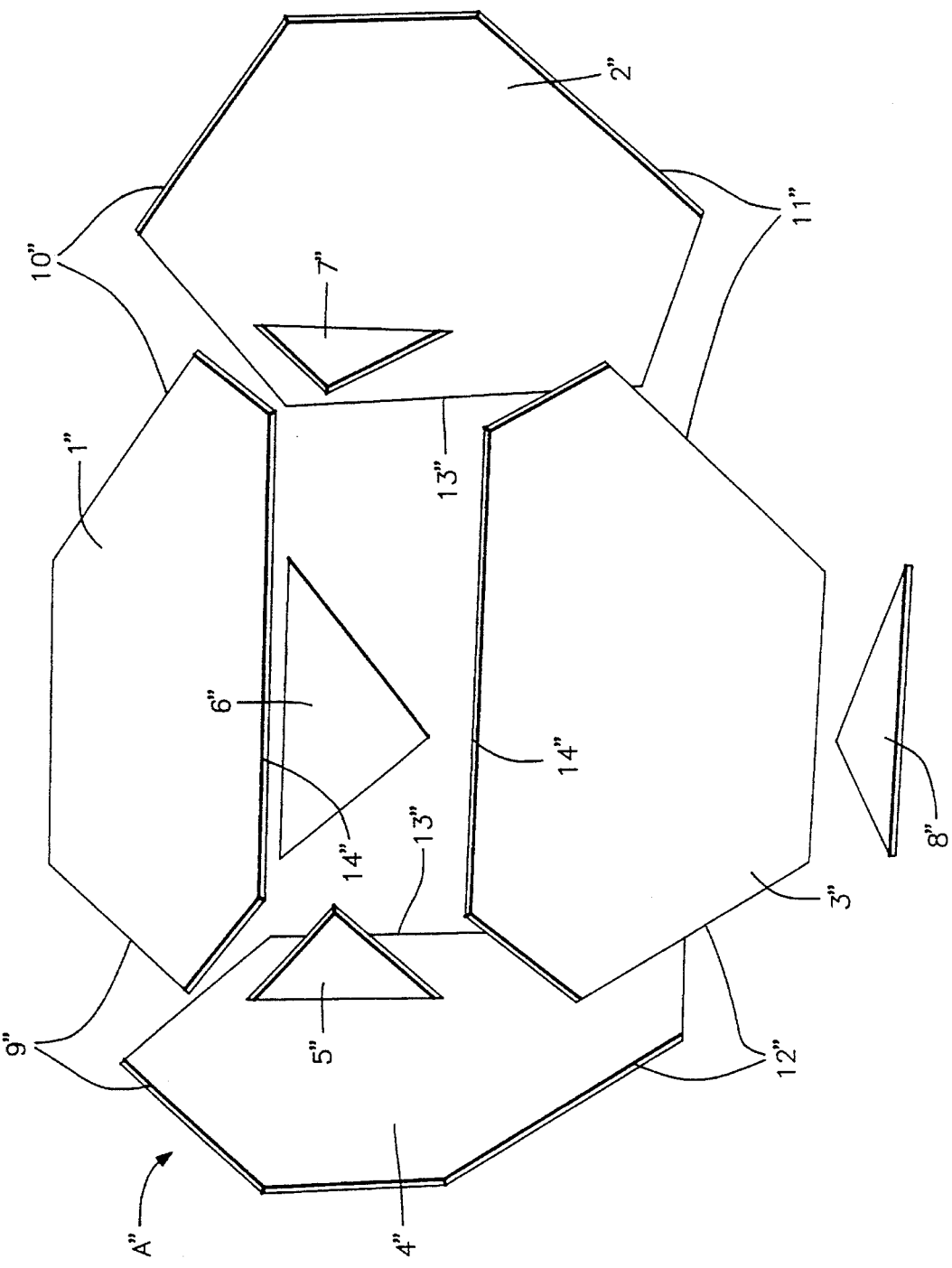
FIG. 6 is an exploded perspective of the third kaleidoscope.

The third kaleidoscope shown in FIGS. 5 and 6 comprises a housing A" made of four hexagonal panels 1"–4" and four triangular windows 5"–8".

Panel 1" is positioned at a dihedral angle of 60° with mirror 2" along edge 10".

Panel 1" is positioned at a dihedral angle of 60° with mirror 4" along edge 9".

Panel 1" is positioned at a dihedral angle of 90° with mirror 3" along edge 9".

Panel 2" is positioned at a dihedral angle of 90° with mirror 4" along edge 13".

Panel 2" is positioned at a dihedral angle of 60° with mirror 3" along edge 11".

Panel 3" is positioned at a dihedral angle of 60° with mirror 4" along edge 12".

Window 5" is located between panels 1", 3", 4".
Window 6" is located between panels 1", 2", 4".
Window 7" is located between panels 1", 2", 3".
Window 8" is located between panels 2", 3", 4".

Figure 7:
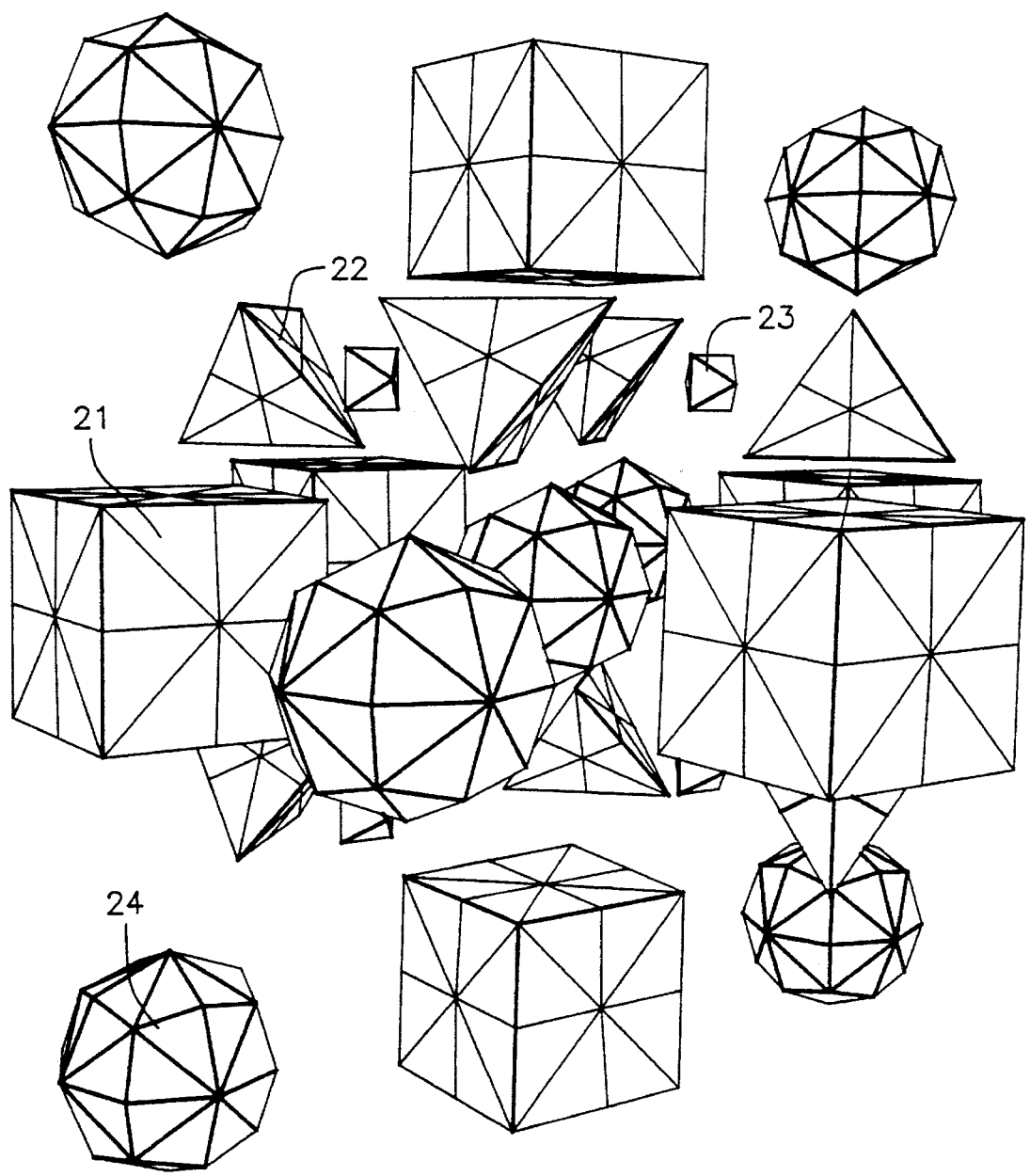
FIG. 7 is a diagrammatic view of images produced in a kaleidoscope according to the invention.

FIG. 7 shows a typical array of solid geometric images produced by the various kinds of triangular windows previously referred to by kaleidoscopic reflection in the interior of kaleidoscopes according to the invention. Such images may, for example, include solid cubes (such as 21), tetrahedra 22, octahedra 23 and sphere-like solids 24. The images are in triaxial symmetry and will extend to infinity.

While only preferred embodiments of the invention have been described herein in detail, the invention is not limited thereby and modifications can be made within the scope of the attached claims.

What is claimed is:

1. A kaleidoscope comprising a housing in the form of a polyhedron enclosing an interior space, the polyhedron comprising a plurality of sides defining internal reflecting mirrors each in the form of an irregular polygon, the mirrors having selected dihedral angles therebetween along edges of the polyhedron and the polyhedron having further sides formed by triangular light-admitting viewing windows which produce images in the form of three-dimensional geometric solids in said space by kaleidoscopic reflections from said mirrors when said space is viewed through any one of the windows.

2. A kaleidoscope as claimed in claim 1, wherein the polyhedron is in the form of an irregular polyhedron with eight sides having four sides defining the internal reflecting mirrors and the other four sides comprising said triangular viewing windows.

3. A kaleidoscope as claimed in claim 2, wherein the four sides defining the internal reflecting mirrors have respective dihedral angles therebetween in a group comprising three dihedral angles of 90°, two dihedral angles of 45° and one dihedral angle of 60°.

4. A kaleidoscope as claimed in claim 2, wherein the four sides defining the internal reflecting mirrors have respective dihedral angles therebetween in a group comprising three dihedral angles of 90°, two dihedral angles of 60° and one dihedral angle of 45°.

5. A kaleidoscope as claimed in claim 2, wherein the four sides defining the internal reflecting mirrors have respective dihedral angles therebetween in a group comprising two dihedral angles of 90° and four dihedral angles of 60°.

6. A kaleidoscope as claimed in claim 1, wherein one of said windows is shaped as an equilateral triangle and is positioned between three of said internal reflecting mirrors having dihedral angles between pairs of the mirrors of 90°, 90° and 90° whereby said one window produces images in said space shaped as octahedra.

7. A kaleidoscope as claimed in claim 1, wherein one of said windows is positioned between three of said internal reflecting mirrors having dihedral angles between respective pairs of the mirrors of 60°, 60° and 90° and whereby the window is perpendicular to one edge of the polyhedron that is defined by one of the 60° dihedral angles whereby the window produces images in said space in the form of tetrahedra.

8. A kaleidoscope as claimed in claim 1, wherein one of said windows is positioned between three of said internal reflecting mirrors having dihedral angles between respective pairs of the mirrors of 60°, 90° and 45° and wherein the window is perpendicular to one edge of the polyhedron that is defined by the 60° dihedral angle whereby the window produces images in said space in the form of octahedra.

9. A kaleidoscope as claimed in claim 1, wherein one of said windows is positioned between three of said internal reflecting mirrors having dihedral angles between respective pairs of the mirrors of 90°, 60°, 45° and wherein the window is perpendicular to one edge of the polyhedron that is defined by one of the 45° dihedral angles whereby the window produces images in said space in the form of cubes.

10. A kaleidoscope as claimed in claim 1, wherein one of the windows is positioned between three of said mirrors which each have equal dihedral angles with respective edges of the window whereby the window produces images in said space in the form of sphere-like polyhedra.

11. A kaleidoscope as claimed in claim 1, wherein one of the windows is in the form of a spherical triangle positioned between three of said mirrors each of which is perpendicular to the window whereby the window produces images in said space in the form of spheres.

12. A kaleidoscope as claimed in claim 2, wherein any of the four windows can be eliminated by continuing the three adjacent mirrors up to their vertices.

13. A kaleidoscope as claimed in claim 1, which includes at least one elongate element disposed along a junction between a pair of the mirrors to produce a scaffolding-like image joining a pair of said three-dimensional geometric images.

14. A kaleidoscope as claimed in claim 12, wherein the elongate element is a light-emitting element.

* * * * *